United States Patent
Del Prado Pavon et al.

(10) Patent No.: US 8,494,001 B2
(45) Date of Patent: Jul. 23, 2013

(54) CONCATENATED FRAME STRUCTURE FOR DATA TRANSMISSION

(75) Inventors: Javier Del Prado Pavon, Ossining, NY (US); Sai Shankar Nandagopalan, Tarrytown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1495 days.

(21) Appl. No.: 10/559,840

(22) PCT Filed: Jun. 10, 2004

(86) PCT No.: PCT/IB2004/050885
§ 371 (c)(1),
(2), (4) Date: Dec. 8, 2005

(87) PCT Pub. No.: WO2004/112324
PCT Pub. Date: Dec. 23, 2004

(65) Prior Publication Data
US 2006/0153203 A1 Jul. 13, 2006

Related U.S. Application Data

(60) Provisional application No. 60/478,156, filed on Jun. 12, 2003, provisional application No. 60/529,588, filed on Dec. 15, 2003.

(51) Int. Cl.
*H04J 3/24* (2006.01)
(52) U.S. Cl.
USPC .......................................................... 370/473
(58) Field of Classification Search
USPC ................... 370/470, 471, 473, 469
See application file for complete search history.

(56) References Cited

U.S. PATENT DOCUMENTS

| | | | |
|---|---|---|---|
| 5,636,140 A * | 6/1997 | Lee et al. | 370/469 |
| 6,721,334 B1 * | 4/2004 | Ketcham | 370/473 |
| 7,031,338 B2 * | 4/2006 | Weaver | 370/465 |
| 7,310,353 B1 * | 12/2007 | Bourlas et al. | 370/473 |
| 7,317,735 B1 * | 1/2008 | Ojard | 370/470 |
| 7,346,026 B2 * | 3/2008 | Sherman et al. | 370/328 |
| 2001/0014104 A1 | 8/2001 | Bottorff | |
| 2002/0034172 A1 | 3/2002 | Ho | |
| 2002/0067721 A1 | 6/2002 | Kye | |
| 2002/0078249 A1 | 6/2002 | Lu | |
| 2002/0122413 A1 | 9/2002 | Shoemake | |
| 2003/0103521 A1 | 6/2003 | Raphaeli | |
| 2003/0169769 A1 * | 9/2003 | Ho et al. | 370/473 |
| 2003/0210673 A1 * | 11/2003 | Nishimura | 370/338 |
| 2004/0151109 A1 * | 8/2004 | Batra et al. | 370/208 |

FOREIGN PATENT DOCUMENTS

| | | |
|---|---|---|
| EP | 1 315 335 A1 | 5/2003 |
| WO | WO 01/33772 A1 | 5/2001 |
| WO | WO 03/048913 A1 | 6/2003 |

* cited by examiner

*Primary Examiner* — Ricky Ngo
*Assistant Examiner* — Ben H Liu
(74) *Attorney, Agent, or Firm* — Larry Liberchuk

(57) ABSTRACT

A method of transmitting data frames over a data network with a MAC protocol, such as a wireless network using IEEE 802.11 protocol, in which a plural number of MAC (Media Access Control) data frames are transmitted with only a single PLCP (Physical Layer Control Procedure) overhead including PLCP preamble and header. In the frame structure used in the method, a single concatenated MAC header is added to the plurality of MAC data frames.

12 Claims, 3 Drawing Sheets

CONCATENATED FRAME STRUCTURE FOR DATA TRANSMISSION

This application claims priority to U.S. Provisional Application Ser. Nos. 60/478,156, filed on Jun. 12, 2003, and U.S. Provisional Application No. 60/529,588, filed on Dec. 15, 2003, the entire disclosures of which are hereby incorporated by reference.

The present invention relates to data transmission techniques, and more particularly, to an optimized method for efficiently transmitting data frames using MAC protocols, such as wireless IEEE 802.11 protocol. The present invention also relates to a novel frame structure used in the inventive method.

The IEEE 802.11 wireless data network standard defines a Media Access Control (MAC) layer and a Physical (PHY) layer for a data network with wireless connectivity. The specification for the physical (PHY) layer specifies on how a MAC frame is transmitted over the air after adding the overheads. When a data frame arrives from the higher layer, the MAC adds the MAC layer header including addresses of the transmitter and the destination (receiver), as well as the MAC layer CRC (Cyclic Redundancy Check) known as Frame Control Sequence (FCS). Thereafter, the MAC determines the physical layer rate at which this frame is to be transmitted in the air and passes the frame to the physical layer. At this layer the frame is added with a physical layer control procedure (PLCP) header and a preamble before being transmitted in the air. The conventional frame structure is shown in FIGS. 1 and 2.

FIG. 1 illustrates a typical frame format of data frames for transmission according to IEEE 802.11 protocol. Each frame typically comprises two parts. One is a PLCP overhead 10, which includes a PLCP preamble portion 11 and a PLCP header portion 12, and the other is a MAC data frame 20, which includes a MAC header portion 21, a MAC frame body portion 22 and a CRC portion 23.

The PLCP preamble 11 is PHY dependent, which includes information mainly used for timing and synchronization functions. The PLCP header 12 mainly includes information about the length of the frame, the transmission rate, etc.

The MAC data frame 20 is illustrated in more detail in FIG. 2. The MAC header Portion 21 includes addresses information 214 and other information, such as Frame Control 211, Duration/ID 212, Sequential Control 213, etc. The MAC layer CRC portion 23 is known as Frame Control Sequence (FCS).

The PLCP overhead 10 is always transmitted at the lowest transmission rates in today's IEEE 802.11 systems. Specifically, the fixed transmission time is 20 microseconds for IEEE 802.11a and 802.11g and is 192 microseconds for IEEE 802.11b. According to the current IEEE 802.11 standard, the maximum size of the MAC frame is 2304 bytes, and each MAC frame is added with the PLCP overhead 10, which substantially decreases the network throughput. Moreover, because of high error rates in wireless networks, the frames may be even fragmented into smaller fragments, and each fragment will have the above said PLCP overhead 10.

Each MAC data frame 20 has a MAC header 21 that includes address information 214 indicating the destination. According to the current MAC protocols such as IEEE 802.11, the address information 214 is included in the MAC header 21 in all the MAC data frames 20 even though they are transmitted to the same destination. This does not lead to an optimized throughput efficiency.

Therefore, there is a need in the art an improved method which is more efficient in transmission of MAC data frames over a data network.

In one aspect, the present invention provides a new method of transmitting data frames over a data network. In particular, according to the present invention, a plural number of MAC (Media Access Control) data frames are transmitted with only a single PLCP (Physical Layer Control Procedure) overhead 10. Because only one PLCP overhead 10 is transmitted with the plurality of MAC data frames, the network throughput and efficiency is considerably increased.

In another aspect, the present invention provides a novel frame structure of packet data to be transmitted over a data network. In particular, according to the present invention, the frame structure comprises a plural number of sequential MAC data frames and only a single PLCP overhead 10.

Preferably, the plural MAC data frames comprise a single concatenated MAC header indicating the plural number as well as the length of MAC data frames.

In a preferred embodiment, if the plural MAC data frames are transmitted to the same destination, the concatenated MAC header further indicates this common destination, and the MAC header portion in each MAC data frame is a compressed MAC header which does not include a portion indicating the destination. This further increases the network throughput and efficiency.

Preferably, the frame structure does not have a limit on the size of the MAC data frames.

The above and other features and advantages of the present invention will be clearer by reading the following detailed description of the preferred embodiments with reference to the accompanying drawings, in which.

Figure 1:
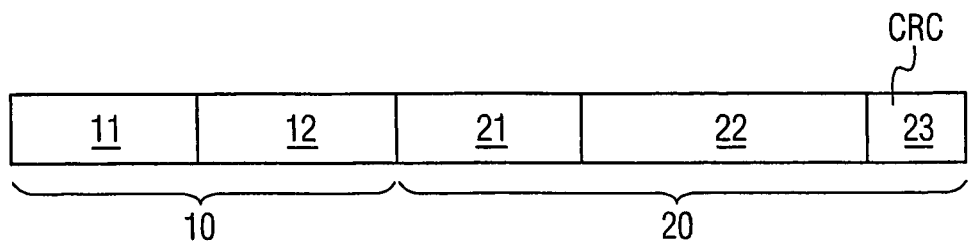
FIG. 1 illustrates a typical frame structure of a conventional packet data for transmission over a wireless data network using IEEE 802.11 protocol.
Figure 2:
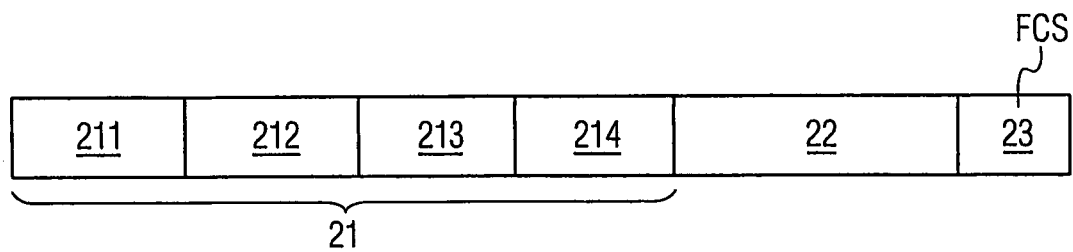
FIG. 2 illustrates components of the MAC data frame shown in FIG. 1.

According to the present invention, instead of transmitting each MAC data frame 20 with a PLCP overhead 10 including a PLCP preamble 11 and header 12, the MAC transmits the PLCP preamble 11 and header 12 only once before the start of the frame transmission and then transmits remaining frames 20 without the PLCP overhead 10 (i.e., the PLCP header 12 and preamble 11). The PLCP preamble 11 and header 12 are used by all receivers. Each receiver decodes only the MAC frames addressed to itself. This is done with the novel frame structure according to the present invention, which is a concatenated frame format (multiple frames packed into a single frame) as shown in FIG. 3.

Figure 3:
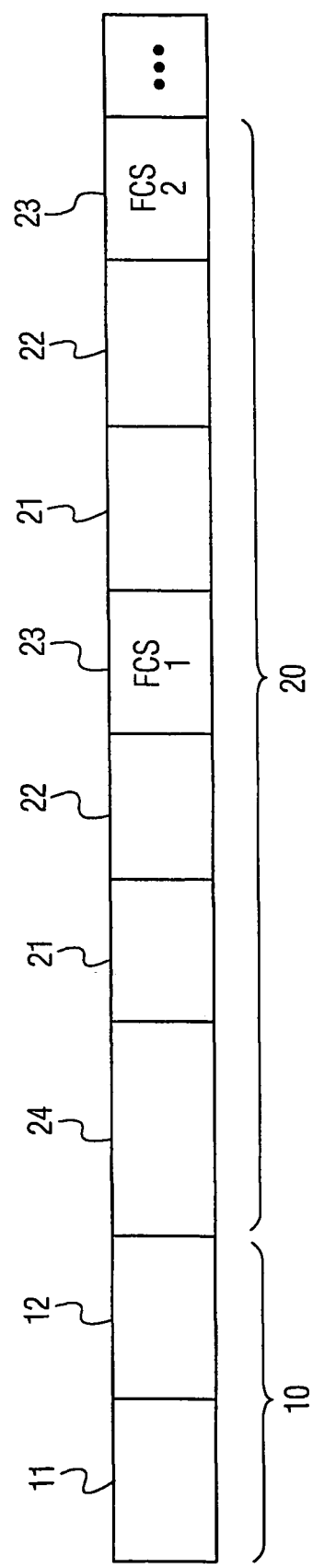
FIG. 3 illustrates a frame structure of an embodiment according to the present invention.

As illustrated in FIG. 3, a plural number of sequential MAC data frames 20, which are queued in the buffers, share a single PLCP overhead 10. This means that except for the first MAC data frame 20, the PLCP overhead 10 is totally eliminated from the succeeding frames 20. Thus, the PLCP overhead 10 is only transmitted once for all the plural MAC data frames 20. This considerably increases the efficiency and throughput of the transmission for these MAC data frames 20, since the PLCP overhead 10 is always transmitted at the lowest rate. For example, if there are ten MAC data frames 20, the overall transmission time for these MAC data frames 20 will be reduced by nine 9 times the single PLCP overhead 10 transmission time. The single PLCP overhead 10 transmission time is typical 20 microseconds for IEEE 802.11 a or 802.11g, or 192 microseconds for IEEE 802.11b.

Preferably, the plurality of MAC data frames 20 further comprises a concatenated MAC header portion 24, which provides information regarding the number of the frames 20 following the PLCP header 12 and its length, so that the receivers will know when the MAC data frames 20 start and end. Only one concatenated MAC header 24 is needed at the beginning of the concatenated frames 20.

The number of the MAC data frames 20 following the single PLCP overhead 10 are preferably determined with consideration of the stability of the channel state. In the case where a concatenated frame 20 is too long, it would be harmful for that frame 20 if the channel stage changes. Based on the estimation of the future channel state during the transmission of the concatenated frame 20, the transmitting station may insert a PLCP preamble 11 after few frames 20 so that the receiver using the channel state information from the preamble 11 can extract the frame if the channel were to go bad during the transmission.

Figure 4:
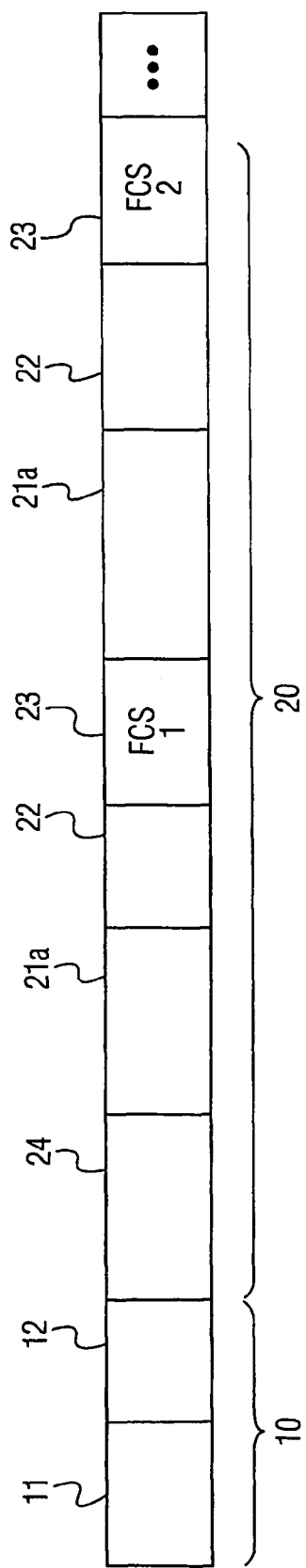
FIG. 4 illustrates a frame structure of another embodiment according to the present invention.

FIG. 4 illustrates another embodiment of the present invention, in which the plural number of MAC data frames 20 are transmitted to the same destination. In this embodiment, the concatenated MAC header 24 further indicates the common destination, while the MAC header 21 in each MAC data frame is compressed. The compressed MAC header 21a only includes certain fields particular to each MAC frame 20, such as a Frame Control field 211, Sequence Control fields 213, etc, and does not include the portion indicating the common destination. Thus, the size of each MAC frame 20 can be reduced, which further increases the network throughput and efficiency as compared to the embodiment in FIG. 3.

Though the above has described the preferred embodiments in detail, it shall be appreciated that, without departing the spirit of the present invention, various changes, adaptations and amendments are possible to a skilled person in the art. For example, preferably the size of the MAC data frames 20 is not limited to 2304 bytes as required by the current IEEE 802.11 standard, so the network throughput may be further improved. Moreover, the present invention is not limited to the wireless data network environment using IEEE 802.11 protocol, it is also applicable to any physical media with any MAC protocol. Thus, the protection scope of the present invention is intended to be solely defined in the accompanying claims.

What is claimed is:

1. A method of generating data frames for transmission over a data network, comprising:
   combining, by a station, a plurality of MAC (Media Access Control) data frames with only a single Physical Layer Control Procedure (PLCP) overhead, each MAC data frame including a header, a data field, and a frame check sequence (FCS), wherein the header, data field, and frame check sequence respectively correspond to a MAC header portion, a MAC frame body portion, and a CRC (Cyclic Redundancy Check) portion;
   combining, by the station, a concatenated MAC header with the single PLCP overhead, the concatenated MAC header indicating both a number of MAC data frames in said plurality of MAC data frames and a length of the plurality of MAC data frames, wherein the concatenated MAC header is separate from the MAC header in each MAC data frame of the plurality of MAC data frames; and
   if said plurality of MAC data frames are addressed to a common destination, both said concatenated MAC header further includes an indication of the destination and said MAC header portion in each MAC data frame of the plurality of MAC data frames is compressed to exclude said destination from said MAC header portion in each MAC data frame of said plurality of MAC data frames.

2. The method of claim 1, wherein said PLCP overhead comprises a PLCP preamble and a PLCP header.

3. The method of claim 1, including inserting said PLCP preamble after transmission of some of said plurality of MAC data frames.

4. The method of claim 1, wherein said PLCP overhead is sent with a first one of said plurality of MAC data frames.

5. The method of claim 1, wherein said data network is a wireless data network.

6. The method of claim 5, wherein said wireless data network uses IEEE 802.11 protocol.

7. A station forming a frame structure of packet data for transmission over a data network, wherein the packet data includes:
   a plurality of MAC (Media Access Control) data frames, wherein each MAC data frame includes a header, a data field, and a frame check sequence (FCS), and only a single one of said PLCP overhead is provided to the plurality of MAC data frames, wherein the header, data field, and frame check sequence respectively correspond to a MAC header portion, a MAC frame body portion, and a CRC (Cyclic Redundancy Check) portion;
   a PLCP (Physical Layer Control Procedure) overhead including a PLCP preamble and a PLCP header; and
   a concatenated MAC header indicating both a number of MAC data frames in said plurality of MAC data frames and a length of the plurality of MAC data frames associated with the single PLCP overhead, wherein the concatenated MAC header is separate from the MAC header in each MAC data frame of the plurality of MAC data frames,
   wherein, if said plurality of MAC data frames are addressed to a common destination, both said concatenated MAC header further includes an indication of the destination and said MAC header portion in each MAC data frame of the plurality of MAC data frames is compressed to exclude said destination from said MAC header portion in each MAC data frame of said plurality of MAC data frames.

8. The station of claim 7, wherein said single PLCP overhead is provided in front of a first one of said plurality of MAC data frames.

9. The station of claim 8 wherein said concatenated MAC header is located between said PLCP overhead and said first one of said plurality of MAC data frames.

10. The station of claim 6 wherein said data network is a wireless data network.

11. The station of claim 10 wherein said wireless data network uses IEEE 802.11 protocol.

12. The station of claim 8, wherein the PLCP overhead includes a PLCP preamble.

* * * * *